Sept. 20, 1971        R. W. WALTERS        3,606,406
SNAP ACTION RETAINER
Filed Nov. 26, 1969
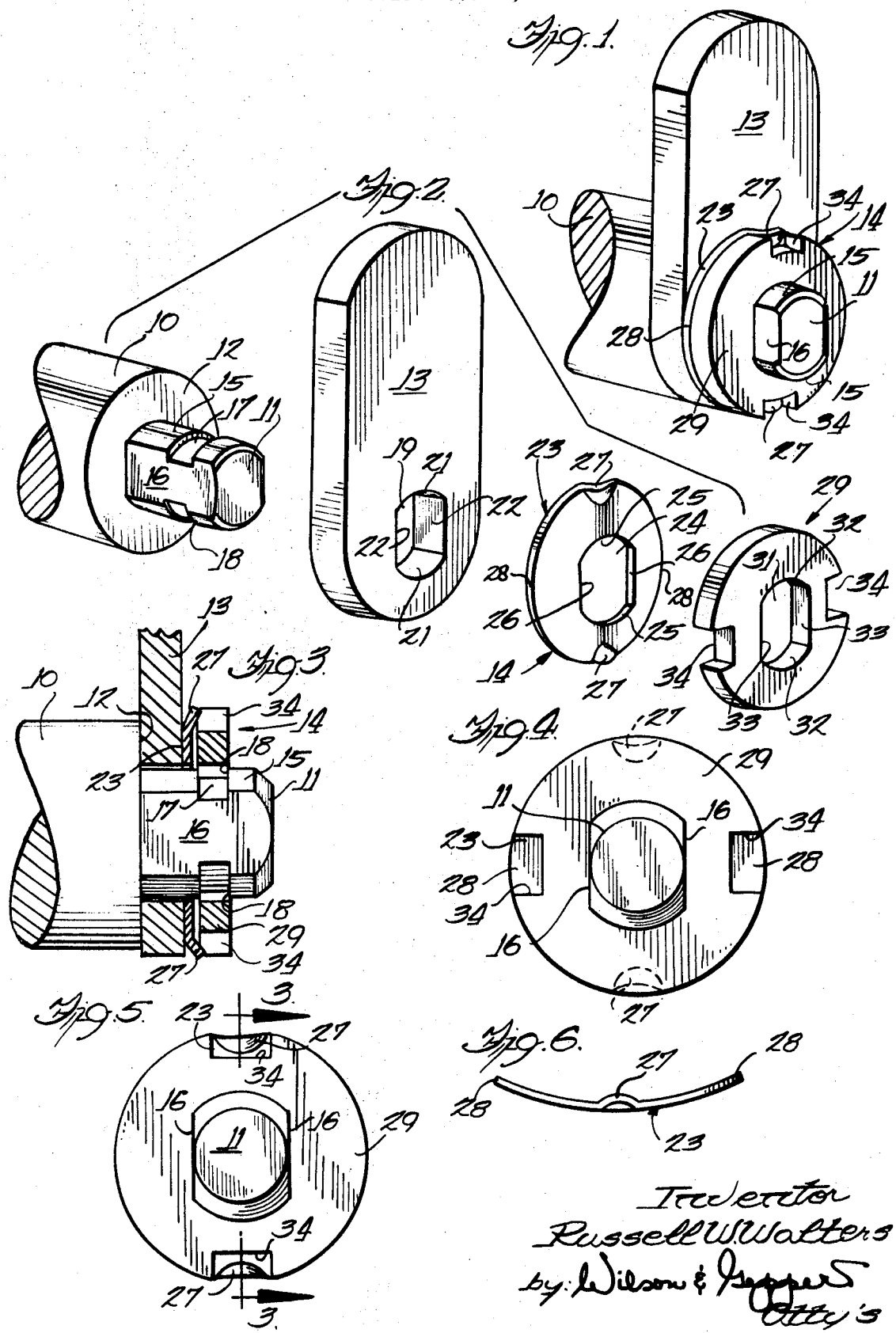
Inventor
Russell W. Walters
by Wilson & Geppert
Atty's ൹nited States Patent Office 3,606,406
Patented Sept. 20, 1971

3,606,406
SNAP ACTION RETAINER
Russell W. Walters, Rockford, Ill., assignor to Keystone Consolidated Industries, Inc., Peoria, Ill.
Filed Nov. 26, 1969, Ser. No. 880,222
Int. Cl. F16b 9/00
U.S. Cl. 287—20                10 Claims

ABSTRACT OF THE DISCLOSURE

A snap action retaining structure for releasably securing a member onto a post or stud formed on a support where the post is generally cylindrical beyond a support shoulder with a pair of opposed flattened sides and an undercut channel or groove. The member to be retained has an opening conformably receiving the modified post circumference as does a stationary retainer spring having opposed detents on the periphery thereof. A retainer has a central opening conformably receiving the post and opposed peripheral notches initially 90° removed from the detents on the spring. Rotation of the retainer relative to the member and spring through an arc of 90° within the groove causes the notches to receive the detents on the spring to resiliently hold the retainer in retaining position.

---

The present invention relates to a snap-action retainer, and more particularly to a retainer for resiliently securing a member onto a post or stud of a support with a minimum number of parts.

Among the objects of the present invention is the provision of a snap action retainer to releasably secure a member onto a support. The retaining structure comprises a post or stud on the support, a retainer spring and a retainer adapted to be rotated relative thereto. The retainer spring includes a pair of oppositely disposed peripheral detents that are deformed outwardly toward the retainer, and the retainer has a pair of oppositely disposed peripheral notches which are initially 90° removed from alignment with the detents. Upon rotation of the retainer on the post relative to the spring, the detents snap into the notches on the retainer and yieldably hold the retainer in such position.

Another object of the present invention is the provision of a snap action retainer for retaining a member on a mounting post or stud of a support where the post has an irregular cross section and the member, the retainer spring and the retainer each have an opening conformably receiving said post so that the member and retainer spring do not rotate on the post. The post also includes a generally annular groove allowing rotation of the retainer relative to the member, the spring, and the post. The member to be retained and the retainer spring are positioned to one side of the groove to prevent rotation thereof.

A further object of the present invention is the provision of a snap-action retainer that is actually manually by the use of a simple tool such as a wrench or suitable tool to latch or release the retainer on the post. In latching position, the inner periphery of the retainer defining the irregular opening cooperates with the undercut surface of the groove on the post to prevent removal of the retainer in an axial direction.

Further objects are to provide a construction of maximum simplicity, efficiency, economy and ease of assembly and operation, and such further objects, advantages and capabilities as will later more fully appear and are inherently possessed thereby.

In the drawings:
FIG. 1 is a perspective view of a member secured onto a post of a support by the snap action retainer of the present invention.

FIG. 2 is an exploded perspective view of the support, the element to be retained and the snap action retainer.

FIG. 3 is a vertical cross sectional view taken on the line 3—3 of FIG. 5, but with the support shown in side elevation.

FIG. 4 is an end elevational view showing the parts as initially assembled before the retainer is rotated.

FIG. 5 is an end elevational view similar to FIG. 4 but with the retainer rotated through an arc of 90°.

FIG. 6 is an edge elevational view of the retainer spring showing the detent configuration thereof.

Referring more particularly to the disclosure in the drawing wherein is shown an illustrative embodiment of the present invention, FIG. 1 discloses the rear end 10 of a locking plug or other suitable support having a post or stud 11 of a reduced diameter thereon and forming a supporting shoulder 12 for a latch bolt 13 or similar element to be secured to the support 10. A snap action retainer assembly 14 is utilized to releasably retain the element 13 on the support 10.

The post or stud 11 has a generally cylindrical surface contour 15 interrupted by a pair of oppositely disposed longitudinally extending flattened surfaces 16, 16 parallel to the axis of the post 11. Spaced from the end of the post is a generally annular groove 17 formed in each of the arcuate portions of the cylindrical surface 15 and of a diameter slightly larger than the distance across the flattened surfaces 16, 16; the groove being interrupted by the flattened surfaces to form oppositely disposed arcuate portions having undercut surfaces 18.

The bolt or other member 13 includes an irregular opening 19 conformably receiving the post 11, the opening having arcuate sides or edges 21, 21 and opposed flattened sides or edges 22, 22. The snap action retaining assembly 14 includes a generally circular retainer spring 23 having an irregular central opening 24 therein corresponding to the opening 19 with oppositely disposed arcuate sides or edges 25, 25 and oppositely disposed flat sides or edges 26, 26 to conformably receive the post or stud 11. A pair of oppositely disposed outwardly bulged detents 27, 27 are formed on the periphery or circumference of the spring aligned with the arcuate edges 25, 25. The spring 23 also has outwardly bowed edges 28, 28 curved from the detents 27, 27 to form a concave curvature for the spring as shown in FIG. 6.

The other part of the retainer assembly 14 is a generally circular retainer 29 having an irregular central opening 31 corresponding to the openings 19 and 24, with oppositely disposed arcuate edges 32, 32 and oppositely disposed flat edges 33, 33. Aligned with the flat edges 33, 33 are a pair of oppositely disposed notches 34, 34 on the periphery of the retainer. The retainer 29 has a thickness approximately equal to the width of the groove 17 for purposes of assembly.

FIG. 2 discloses the parts properly aligned for assembly with the openings 19, 24, 31 of the element 13, the retainer spring 23 and the retainer 29, respectively, being aligned to conformably receive the irregular post or stud 11. In assembly, the bolt or other element 13 is positioned on the post 11 to abut the shoulder 12 of the support 10, and the spring 23 is assembled to abut the element 13 just inside of the groove 17. As the element 13 and spring 23 are located on the post inside of the groove, the element and spring cannot rotate relative to the post 11. Then the retainer 29 is positioned on the post abutting the outwardly bowed edges 28, 28 of the spring 23 with the notches 34, 34 removed 90° from the detents 27, 27 (FIG. 4).

To latch the parts together, the retainer 29 is forced inwardly against the resilient force of the bowed edges 28, 28 of the spring 23 until it is aligned with the groove 17. Then the retainer 29 is rotated 90° in either direction relative to the post 11, the spring 23, and the member 13 until the detents 27, 27 snap into the peripheral notches 34, 34 on the retainer (FIG. 5). The flat edges 33, 33 of the opening 31 in the retainer 29 have now been rotated behind the arcuate undercut surfaces 18, 18 defined by the groove 17 to prevent removal of the retainer from the post 11. Also, the resilient force exerted by the bowed edges 28, 28 of the retainer spring 23 urges the retainer 29 into frictional engagement with the undercut surfaces 18 of the post. Removal of the member 13 is effected by rotation of the retainer 29 in either direction against the force of the detents 27, 27 and the bowed edges 28, 28 to snap the detents out of the notches 34, 34 in the retainer 29 until the position of FIG. 4 is again reached, at which time the retainer 29, the retainer spring 23 and the element 13 can be axially removed from the post 11.

While the snap action retainer has been shown and described as being advantageously applicable to the securing of a latch or lock bolt to a rotary lock plug, it is not my desire to unnecessarily limit the scope or the utility of the improved features by virtue of this illustrative embodiment. Obviously this retainer can be utilized generally for the securement of an element or object to a suitable support.

Having thus disclosed my invention, I claim:

1. A snap action retainer assembly to secure an element onto a support, comprising a post formed on a support to provide a supporting shoulder for the element to be secured thereto, said post having an irregular contour in cross section, the elements to be retained having an irregular opening therethrough conformably receiving said post, a retainer spring having a central irregular opening therethrough conformably receiving said post, a retainer having a central irregular opening conformably receiving said post, means allowing rotation of said retainer relative to said post, said element and said retainer spring including a pair of flattened longitudinally extending surfaces on said post, said post having a generally annular groove intersecting and interrupted by said flattened surfaces and of a diameter slightly greater than the distance across said flattened surfaces but less than the maximum diameter of said post, and cooperating detent means on said retainer spring and said retainer interengaging upon rotation of said retainer relative to said retainer spring.

2. A snap action retainer assembly as set forth in claim 1, in which said retainer is initially positioned on said post aligned with said groove and then rotated approximately 90° to a retaining position, said groove providing undercut surfaces cooperating with said retainer when in its retaining position to prevent axial movement of said retainer relative to said post.

3. A snap action retainer assembly as set forth in claim 2, in which said element to be retained is positioned on said post beyond said groove and abutting said shoulder, said retainer spring is positioned on said post beyond said groove and abutting said element, and said retainer is positioned on said post generally aligned with said groove and abutting said retainer spring.

4. A snap action retainer assembly as set forth in claim 3, in which said retainer is pressed inward against the force of said retainer spring to accurately align the retainer with said groove and then rotated approximately 90° to cause said detent means to engage to yieldably maintain the retainer against further rotation.

5. A snap action retainer assembly to secure an element onto a support, comprising a post formed on a support to provide a supporting shoulder for the element to be secured thereto, said post having an irregular contour in cross section, the element to be retained having an irregular opening therethrough conformably receiving said post, a retainer spring having a central irregular opening therethrough conformably receiving said post, a retainer having a central irregular opening conformably receiving said post, means allowing rotation of said retainer relative to said post, said element and said retainer spring, and cooperating detent means on said retainer spring and said retainer including a pair of outwardly bulged oppositely disposed detents on the periphery of said retainer spring, and said retainer has a pair of oppositely disposed peripheral notches which are removed approximately 90° from the detents when the spring and the retainer are initially placed and assembled on said post, and when said retainer is rotated approximately 90° relative to said post and said spring, said detents snap into and are retained in said notches.

6. A snap action retainer assembly as set forth in claim 5, in which said retainer spring has outwardly bowed edges to provide a concave configuration curved from the detents.

7. A snap action retainer assembly to secure an element onto a support, comprising a post formed on a support to provide a supporting shoulder for the element to be secured thereto, said post having an irregular contour in cross section, the element to be retained having an irregular opening therethrough conformably receiving said post, a retainer spring having a central irregular opening therethrough conformably receiving said post, a retainer having a central irregular opening conformably receiving said post, means allowing rotation of said retainer relative to said post, said element and said retainer spring, cooperating detent means on said retainer spring and said retainer interengaging upon rotation of said retainer relative to said retainer spring, and cooperating means on said retainer and said post to retain said retainer on said post upon rotation of said retainer relative to said post including undercut surfaces formed by a groove on said post having a diameter greater than the minimum diameter of said post but less than the maximum diameter, and the edges of the irregular opening conformably receiving said post engaging said undercut surfaces when the retainer is rotated approximately 90° from its initial position of assembly.

8. A snap action retainer assembly as set forth in claim 7, in which said post is generally cylindrical with a pair of oppositely disposed longitudinally extending flattened surfaces thereon, and the openings in said element, said retainer spring and said retainer conforming with and each opening having a pair of oppositely disposed flat edges to conformably receive said post.

9. A snap action retainer assembly as set forth in claim 8, in which said detent means includes a pair of outwardly bulged oppositely disposed detents on the periphery of said retainer spring and removed 90° from the flat edges of the opening therein, and said retainer has a pair of oppositely disposed peripheral notches aligned with the flat edges of the opening therein and removed 90° from the detents when the retainer and the spring are initially assembled on said post, and when said retainer is rotated 90° relative to said post and said spring, said detents snap into and are yieldably retained in said notches.

10. A snap action retainer assembly as set forth in claim 9, in which said retainer spring has outwardly bowed edges 90° removed from and to provide a concave configuration curved from the detents.

References Cited

UNITED STATES PATENTS 2,593,064   4/1952   Silberman _____ 85—36X

DAVID J. WILLIAMOWSKY, Primary Examiner

W. L. SHEDD, Assistant Examiner

U.S. Cl. X.R.

85—8.6; 24—221R